United States Patent Office 3,274,117
Patented Sept. 20, 1966

3,274,117
POURABLE AND FREE-FLOWING DETERGENT, WETTING, AND EMULSIFYING COMPOSITIONS
Werner Stein, Dusseldorf-Holthausen, Herbert Weiss, Cologne-Deutz, and Otto Koch, Hilden, Rhineland, Germany, assignors to Henkel & Cie G.m.b.H., Dusseldorf-Holthausen, Germany, a corporation of Germany
No Drawing. Filed May 7, 1963, Ser. No. 278,780
Claims priority, application Germany, May 17, 1962, H 45,806; Aug. 31, 1962, H 46,801; Jan. 23, 1963, H 48,069
10 Claims. (Cl. 252—161)

This invention relates to new and improved detergent preparations which have excellent detergent, wetting, and emulsifying properties, and more particularly this invention relates to detergent, wetting, and emulsifying agents which are characterized by their ability to flow freely and the absence of any tendency on their part to cake even when stored for prolonged periods.

It has been noted that many of the known synthetic surface active agents which are used as detergents, wetting agents, and emulsifiers in pourable or free-flowing form, and particularly as powders, as well as the pourable preparations made therefrom by combination thereof with the usual accompanying substances, have certain undesirable properties and in particular tend to be sticky and to cake up under unfavorable atmospheric conditions. This phenomenon has been observed for synthetic surface active agents of the sulfate or sulfonate type among others.

Essentially the invention comprises pourable and free-flowing detergents, wetting agents, and emulsifiers containing as active ingredients salts of sulfonated fatty acid esters. The salts of sulfonated fatty acid esters form efficient powders, particularly when they contain no branched-chain fatty acid or alcohol radicals, but it has been found that their powder properties are markedly reduced on storage especially when exposed to unfavorable atmospheric conditions.

It is an object of the invention to improve the pouring and shelf-life properties of free-flowing detergent, wetting, and emulsifying compositions.

A further object of this invention is to provide highly effective detergent, wetting, and emulsifying agents in a solid form characterized by improved pouring, shelf-life, and stability properties.

Still a further object of the invention is to provide highly effective detergent, wetting, and emulsifying compositions containing as active ingredients salts of sulfonated fatty acid esters.

A still further object of the invention is to provide highly active detergent, wetting, and emulsifying compositions containing as active ingredients salts of sulfonated fatty acid esters, as well as commercially attractive methods for preparing the same.

Further objects and advantages will become apparent in the course of the following description.

In accordance with the invention it has now been found that the above difficulties in pourability and storage may be overcome and detergents, wetting agents, and emulsifiers of improved efficiency in various forms, such as for example flakes, spray or drum dried, powdered, etc. containing as active ingredient fatty acid ester sulfonates, may be obtained by adding to or incorporating therewith an amount of sulfo fatty acid salt. The advantage of the invention can readily be appreciated from the fact that the substances, i.e. sulfo fatty acid salts used for improving the powder properties of the detergent themselves possess surface activity and therefore do not constitute ballast materials in the final preparation.

"Pourable or free-flowing" preparations are defined as those whose particle size is so small that they are usually poured when they are being packed or when they are being used by the consumer. They include, for example, the various types of powders, such as hollow bead powders, which are obtained by the conventional methods for the production of powdered detergents as well as granules, agglomerates, etc. Other forms of pourable and free-flowing preparations are also within the scope of the invention including such examples as needles, as prepared with extrusion machines, ribbons, flakes, etc.

The salts of the sulfo fatty acids and the salts of sulfo fatty acid esters to be used according to the invention are derived from saturated straight-chain or branched-chain fatty acids having 10 to 24 and preferably 12 to 18 carbon atoms, the sulfonic acid group, preferably, being in the α position as for example the sulfo fatty acid of the formula

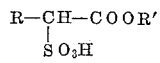

The salts can be sodium, potassium, magnesium, or ammonium salts or salts produced from an amine or an organic base, preferably one having a maximum of 6 carbon atoms. The sulfo fatty acids can be present as mono- or di-salts. For the sake of simplicity, hereinafter the salts of sulfo fatty acid esters will be called "ester salts," and the salts of sulfo fatty acids will be called "disalts," though the latter term is intended to cover the monosalts as well.

In connection with the ester salts, the alcohol radicals can be derived from univalent straight-chained saturated aliphatic alcohols having 1 to 18 and preferably 1 to 10 carbon atoms in their molecule. However, the sulfo-fatty acid ester salt may also be derived from polyvalent alcohols, where the radicals of these polyvalent alcohols, and namely those having 2 to 6 hydroxyl groups present in the molecule, do not have all of the hydroxyl groups of these polyvalent alcohols esterified with fatty acid radicals, more particularly with sulfo fatty acid radicals. On the average at least one third and preferably more than two thirds, and most preferably more than three-fourths of the fatty acid radicals should contain one sulfonic acid group in this respect. However, it is also possible for all of the fatty acid radicals to be sulfonated, so that in the case of the triglycerides, for example, the esters can be produced from one mol of glycerin and three mols of sulfo fatty acid.

The sulfo fatty acid ester salts of polyvalent alcohols, as for instance, the sulfo fatty acid triglycerides, suitable for use according to the invention include those which contain, in addition to fatty acid radicals or sulfo fatty acid radicals having 10 to 24 carbon atoms per radical, lower fatty acid radicals, most advantageously those having 2 to 6 and preferably 2 to 4 carbon atoms per radical. For the sake of simplicity, the lower fatty acid radicals will be referred to hereinafter as "acyl radicals." The sulfo fatty acid ester salts of polyvalent alcohols must contain at least one higher fatty acid or sulfo fatty acid radical, i.e. one having 10 to 24 carbon atoms. There may be further such radicals as well as lower fatty acid radicals as just set out above. In the case of the triglycerides, the sulfo fatty acid ester salts can be obtained, for example, from a monoacyl triglyceride or a diacyl triglyceride. The sulfonate groups can be present in the higher fatty acid radicals and/or in the acyl radicals. These triglyceride derived sulfo fatty acid ester salts, also have to contain at least two or three and preferably more than three or four sulfonate groups for each fatty acid radical present.

In the preparation of the detergents and wetting agents, ester salts with univalent or polyvalent alcohols which contain not more than 4 carbon atoms in the alcohol radical are primarily employed and in the case of the sulfo fatty acid esters of univalent alcohols, the starting fatty acid and alcohol are selected with a view that the ester produced contains at least 11 and at most 24 carbon atoms. Esters having higher alcohol radicals are suitable for use as emulsifiers and particularly the esters of alcohols having 5 to 18 and preferably 6 to 12 carbon atoms in its molecule.

In the preparation of the sulfo fatty acid ester component, in accordance with the invention, the fatty acids are generally of natural origin, and, in the production of the sulfo fatty acid ester, the starting fat material is selected on the basis that its fatty acid composition will come closest to that which is required for producing the desired properties in the final sulfo fatty acid ester salt.

Examples of fatty acids which are suitable include such as stearic, palmitic, oleic, coconut fatty acids, palm oil, palm kernel oil, and other natural fatty acids having similar compositions. However, fats which are formed predominantly of higher fatty acids are also suitable. An instance of such a fat is tallow. The sulfo fatty acid esters may contain different alcohol radicals, and further mixtures of sulfo fatty acid esters derived from univalent alcohols may be employed in admixture with sulfo fatty acid esters derived from polyvalent alcohols as for example mixtures of triglyceride sulfonates and sulfonates of fatty acid esters having from 1 to 4 carbon atoms in the radical of the univalent alcohol.

Whatever has been said above with respect to the chain length distribution in the fatty acid radical of the ester salts applies equally to the chain length distribution of the disalts which are suitable for use in accordance with the invention.

It has been found particularly advantageous for the chain length distribution of the fatty acid radicals in the disalts to be substantially the same as that of the fatty acid radicals in the ester salts. This can be quite simply brought about, for example, by using ester salts and disalts produced from fatty acid mixtures of the same origin.

The method of adding the disalt to the ester salt to improve and stabilize its free-flowing properties may vary considerably. For example, the ester salts or pourable free-flowing preparations containing the same can be added directly to the disalts. If care is taken to ensure that the particle size of the disalts is substantially smaller than that of the ester salts or of the preparations containing the same, then small amounts of disalts will often suffice to produce a thin coating of disalt on the surface of the ester salts or on the surface of the preparations containing them and thus act to reduce or prevent mutual contact between particles containing ester salts. In this connection, preferably the average particle size of the sulfo fatty acid salts should amount to a maximum of $\frac{1}{5}$ and most preferably a maximum of $\frac{1}{10}$ that of the sulfo ester salt.

The novel compositions of the invention can also be prepared by methods which produce a mixture of the ester salts and disalts that is practically homogeneous even as concerns molecular dimensions. This can be carried out by any process for accomplishing the desired homogenization, such as is well known to the industry, as for example by spray crystallizing or spray drying a solution or paste of ester salts and disalts. For example, the disalt may be added in dry form to the ester salt in paste form and incorporated therein by any of a number of well-known methods. The mixture may then be dried in any manner, such as for example, spray drying or drum drying to give it a variety of forms as above set out. If the two salts, namely the disalt and the ester salt are not completely dissolved in the mixture, which is prepared for spray drying or drum drying, etc., the ester salt and disalt mixture will be one which is not after final treatment a substantially homogeneous one, even down to molecular dimensions. However, the inhomogeneous starting mixtures are eminently suitable for use in accordance with the invention.

Sulfonation products which contain sulfo fatty acid esters and sulfo fatty acids or salts thereof in admixture with one another are suitable for use in the preparation of the pourable and free-flowing detergents, wetting agents, and emulsifiers in accordance with the invention. These sulfonation products can be obtained, for example, by sulfonating mixtures of fatty acids and fatty acid esters with a sulfonating agent, such as, for example, sulfuric acid, chlorosulfonic acid and the like in the customary manner. It is also possible to obtain these sulfonation products when processing sulfo-fatty acids, and in particular when neutralizing the same to treat the reaction mixture so that the saponification of a portion of the esters present can take place. Another procedure involves partially esterifying sulfo fatty acids with such quantities of alcohol that the desired percentage of non-esterified sulfo fatty acids is produced.

Preferably, the disalt content should be from 10 to 40 percent by weight of the said mixture, but the sulfo-fatty acid salt is generally present in an amount of from 5–65 percent based on the total weight of a mixture of the ester salts and disalts.

It has furthermore been found that the above-described improvement in powder properties produced by incorporation of the disalts can also be obtained when the preparations contain in addition to the surface active sulfo fatty acid ester salts other conventional surface active agents, and in particular anionic surfactants. These include the alkali soaps derived from saturated or unsaturated fatty acids having 10 to 24 and preferably 10 to 18 carbon atoms in their molecule. In particular there may be used the synthetic anionic products of the sulfate or sulfonate type containing aliphatic hydrocarbon radicals having 8 to 20, preferably 10 to 18, and most preferably 12 to 16 carbon atoms. Illustrative of such anionic products are the alkylbenzenesulfonates having straight or branched alkyl chains, and the alkylsulfonates which are obtained, for example, by reacting a saturated hydrocarbon with sulfur dioxide and oxygen or sulfur dioxide and chlorine and thereafter saponifying the intermediate which is formed. Alternatively, the alkyl sulfonate can be obtained by reacting an olefin with a strong sulfonating agent, such as, for example oleum, chlorosulfonic acid or sulfur trioxide, and thereafter hydrolyzing the product which is formed. The alkyl sulfates or "fatty alcohol sulfates," which may be obtained by neutralization with a suitable base, such as sodium or potassium hydroxide, ammonia, an amine or an organic base, of the reaction product of individual higher molecular weight alcohols, or from a mixture of such alcohols, such as those obtainable by reduction of fatty acids, or oils, and fats of vegetable or animal origin with a sulfonating agent, such as sulfuric acid, chlorosulfonic acid, and the like in the customary manner are also suitable for inclusion in the compositions of the invention. As surfactants, there may also be included compounds in which the hydrophobic hydrocarbon radical and the solubilizing sulfate or sulfonate group are joined by one of oxygen, nitrogen, and sulfur, or by a radical containing oxygen, nitrogen or sulfur. Exemplifying such latter compounds are fatty acid esters or fatty alcohol ethers of oxyethanesulfonic acid, oxypropanesulfonic acid, dioxypropanesulfonic acid, or other oxysulfonic acid. The dioxypropanesulfonic acid derivatives are also known as alkyl glyceryl ether sulfonates, or as fatty acid glycerin ester sulfonates. Further examples of surfactants in which the hydrophobic hydrocarbon radical, and the solubilizing sulfate or sulfonated group are linked by one of oxygen, nitrogen, sulfur or a radical containing the same, include the fatty acid amides derived from aminosulfonic acids, and in particular from aminoethanesulfonic acid. This latter group of surfactants also includes such compounds of the sulfate type as the sulfated fatty acid alkylolamides. Further instances of suitable surfactants for incorporation are the sulfated partial esters of fatty acids or partial ethers of fatty alcohols with polyvalent alcohols, such as glycol, diglycol, triglycol, and higher glycols with glycerin and di- and polyglycerins. Such partial ethers or partial esters are conventionally obtained by the addition of ethylene and/or propylene oxide, and/or glycide to fatty alcohols or fatty acids. However, other addition products of the above-mentioned alkylene oxide compounds with starting materials, as for example alkyl phenols, alkyl thiophenols, fatty acid amides or alkylolamides, fatty amines, or mercaptans, are suitable for incorporation in the compositions in accordance with the invention provided that the same are in sulfated form.

The amount in which the other surface active materials can be present depends entirely on the preservation of the desirable powder properties in the composition by the disalts. This depends to a great extent on the powder properties and characteristics of the other surface active materials. Preferably, the additional surface active materials should not be present in an amount greater than 65 weight percent, and preferably should be present in an amount less than 50 weight percent, and most preferably less than 40 weight percent, with reference to the mixture of the ester salts and the additional surfactants. A particularly favorable percentage range for the additional surfactants amounts to 5 to 30 weight percent. As has been noted heretofore, according to the invention the sulfo fatty acid salts (disalts) should be present in an amount of 5% of the total weight of the mixture of ester salts and disalts. Preferably, however, the same should be present in an amount of more than 10 weight percent with respect to the total mixture of ester salts, other surfactants and disalts, the ester salt content in the three-component mixture (ester salts, surfactants and disalts) advantageously amounts to at least 25 weight percent and most advantageously to at least 35 weight percent.

The total amount of active ingredients present in the composition in accordance with the invention amounts to from 10–75%, and preferably amounts to 50% of the total weight of the final pourable preparation.

The additional surfactants which can be incorporated into the compositions in accordance with the invention can consist in whole or in part of non-ionic surfactants and particularly of compounds having hydrophobic radicals containing at least 8 and preferably 10 to 24 and most preferably 12 to 18 carbon atoms, which radicals are linked directly or through intermediate groups with non-ionic solubilizing radicals. The hydrophobic radicals are straight chain or branch chain alkyl radicals and may be derived from the fatty acid or fatty alcohol radicals or from an alkyl-aryl compound. Aggregations of hydroxyl groups, ethylene glycol radicals, or amino oxide radicals are satisfactory as non-ionic solubilizing groups. The hydrophobic radicals and non-ionic solubilizing groups can be linked together by ethyl or thioethyl atoms, amino-nitrogen atoms, ester groups, carboxylic or sulfonic acid amide groups, etc.

The non-ionic surfactants which have proved most advantageous are the etherification products of hydrophobic or organic hydroxyl group containing compounds with a polyethylene glycol or the esterification products of a hydrophobic acid, preferably a carboxylic acid with a polyethylene glycol. Generally, these compounds are prepared by addition of ethylene oxide to an hydrophobic starting material containing an active hydrogen atom, the number of ethylene glycol radicals present in the molecule must be sufficient for the resulting compound to be water soluble. The amount of ethylene glycol radicals required for this water solubility varies with the chain length of the hydrophobic radicals. Frequently, 4 to 16 ethylene glycol radicals per molecule produce sufficient water solubility. The number of ethylene glycol radicals can, however, amount to 20, 30, 40, 60 or up to 100 per molecule.

Examples of non-ionic surfactants suitable for use in accordance with the invention include the addition products of ethylene oxide and fatty alcohols, alkyl-phenols, fatty acids, fatty acid amines, fatty acid alkylol amides, alkyl sulfonic acid amides, alkyl benzene sulfonic acid amides, alkyl-alkylol amides, partial ethers of fatty alcohols, partial esters of fatty acids of polyvalent alcohols, etc. The latter compounds also include partial ethers or partial esters derived from glycerin or from polyglycerins, such as those obtained, for example by condensing a glycide with a fatty alcohol or fatty acid. If the partial ethers or partial esters contain at least 3 and preferably 4 to 10 free hydroxyl groups in the molecule, they often have sufficient water solubility for satisfactory use in accordance with the invention even without the further addition of ethylene oxide.

The compounds which can be used according to the invention, however, also include those in which hydrophobic organic compounds containing an active hydrogen atom are first reacted with an higher alkylene oxide, such as propylene or butylene oxide, and thereafter ethylene oxide is added on until water solubility is achieved. It is also possible to prepare water soluble materials by the addition of sufficient ethylene oxide, followed by addition of limited amounts of propylene oxide, that is additions in sufficiently small amounts that the final compounds remain water soluble. These non-ionic surface active agents are characterized by their especially low suds producing properties.

Further, non-ionic substances which are suitable for use according to the invention include those non-ionic products known under the trade names "Pluronics" or "Tetronics." "Pluronics" are those polyethers having polypropylene glycol chains which are water-insoluble in themselves, but which are linked with solubilizing ethylene glycol chains and thereby made water-soluble. The "Tetronics" designate a variant of these compounds in which several propylene glycol chains are linked with the nitrogen atoms of a central amine radical, preferably an alkylene diamine radical, terminating in water-solubilizing ethylene glycol chains.

The surface active aminoxides which can be used according to the invention include those products in which the hydrophobic radical and the radical bearing the aminooxide group are separated from one another by ether or thioether groups. The ether groups are present preferably in the form of ethylene glycol, polyethylene glycol, propylene glycol, polypropylene glycol, glycide or polyglycerin radicals.

Many surface active aminoxides and a number of surface active fatty acid esters or fatty alcohol ethers of water-soluble carbohydrates, especially sugars, are readily differentiated from other oily to pasty surface active preparations by their satisfactory powder properties. The non-ionic surface active substances can be incorporated with the surface active ester salts and disalts in amounts corresponding to the data given above for the other additional surface active substances. If only a portion of the additional surface active substances consists of non-ionic surfactants, the percentage of the latter can amount to about 10 to 90% and preferably 20 to 80% and most preferably 40 to 60% of the weight of the other surfactants. If the non-ionic surfactants are in the form of oily liquids or viscous pastes, as is often the case, then it is advantageous to use them in quantities amounting to no more than 25% of the total of all of the wash-active substances.

By suitably combining the ester salts, disalts, other anionic surfactants and non-ionic surfactants, it is possible to extensively influence the wetting, detergent, foaming and emulsifying properties of the preparations of the invention. In particular, the foaming and/or sudsing properties can be varied. Thus, for example, combinations of ester salts, disalts, soap and non-ionic surface active agents are suitable as low-suds producing washing machine detergents, and particularly so, when the soaps or free fatty acids corresponding thereto have contents of more than 50% of their weights of saturated fatty acid radicals having 16 or more carbon atoms, although fatty acid radicals having 20 and more and particularly having 20–26 carbon atoms are present.

The combinations of the invention can be used per se as detergents, wetting agents, and emulsifiers, or can be employed together with the known additives conventionally used in such preparations. The percentage of the ester salt-disalt mixture in the combination should amount to 10–75%, preferably 15–50% of the weight of the entire pourable preparation.

As noted above, the detergent, wetting, or emulsifying compositions in accordance with the invention are suitable for use per se or in admixture for the conventional products employed in the formulations of such agents. A particularly advantageous application of the combinations in accordance with the invention is as wash agents for use in the washing and bleaching treatment of textiles. In this connection, additives which impart to the final preparation a pH value within the range of 6–12 have proved particularly suitable. The pH value is determined using as test sample a 1% solution of a detergent composition. The pH range extending from 6–12 includes the agents intended as fine wash-agents and which are required to be regulated so as to have a slightly acid to alkaline pH, i.e. approximately within the range of 6–8.5 and preferably within the range of 7–8, as well as the agents intended for use as boiling wash agents and having a pH value approximately within the range of 9–12 and preferably of 9.5–11.5.

The combinations in accordance with the invention may be employed in conjunction with neutral or alkaline reacting salts, slightly acid reacting compounds as well as with the customary agents used to improve foaming, soil removal, and such additives as bleaching agents, corrosion protection agents, etc.

A neutral reacting salt which is most advantageously used is sodium sulfate, the same additionally acting to improve the effectiveness of the combination in accordance with the invention. It can be replaced, however, in whole or in part by non-surfactive, neutral reacting organic salts, such as, for instance, non-surface active arylsulfonate, exemplified by such compounds as benzene, toluene, or naphthaline sulfonates.

The wash-alkalies which are suitable for use in connection with the invention include the alkali carbonates, alkali bicarbonates, water-soluble alkali silicates, alkali orthophosphates, etc.

The combination in accordance with the invention may be used to particular advantage in conjunction with the anhydrous phosphates. The anhydrous phosphates employed may be any pyrophosphate, polyphosphate, or metaphosphate; the tripolyphosphates and tetrapolyphosphates having been found to possess particular practical significance. The pyro- and poly-phosphates are alkaline in reaction and are, therefore, able when used alone in boiling wash-agent compositions to impart to the same the necessary alkalinity; however, the metaphosphates produce a slightly acid reaction and are therefore advantageously utilized in the production of fine-wash agents serving to decrease the pH value of the resulting combination. Examples of other phosphates suitable for the same purpose include the acid orthophosphates, and the acid pyrophosphates. Weak inorganic or organic acids or acid salts of strong inorganic acids, such as, for example, boric acid, citric acid, oxalic acid, lactic acid, glycolic acid, tartaric acid, amidosulfonic acid, and sodium sulfate are instances of other materials suitable for use in regulating the pH value of the washing agent.

Still further, the preparations in accordance with the invention may be used in combination with the other conventional substances as are used in wash agents. These substances include inorganic or organic active oxygen carriers, as, for example the percompounds, and in particular sodium perborate. Products functioning to improve the soil removal property and foaming qualities of the combinations are additionally included in the preparation of wash agents. Instances of substances serving to improve the soil removal capacity include water-soluble colloids, and preferably those of an organic nature, as, for example, the water-soluble salts of polymeric carbon acids, sizes, gelatin, salts of ether carbon acids, or ether sulfonic acids of starch or cellulose, or salts of acid sulfuric acid esters of cellulose or starch. Additives for improving the foaming capacity of the combinations of the invention include fatty acids amides which may be substituted at the nitrogen atom with alkyl or alkoxylol-radicals having at most 6 carbon atoms per radical, as well as the addition products of ethylene oxide to these unsubstituted or substituted fatty acid amides.

The salts which may be added to the combinations in accordance with the invention may be derived from inorganic or organic alkalies as, for example, from sodium, potassium, or from the easily soluble organic amines. Such salts include alkylolamines, for example, mono-, di-, or triethanolamine. The easily soluble salts which may be used in conjunction with the combinations of the invention include wash-active organic sulfates or sulfonates.

It can be appreciated that it is generally desirable in compounding detergent preparations that in spite of the high concentrations of active material, they do not form the substrates readily. To this end, it is advisable to use in connection with the additions, anions which are already present in the combination, although similar thought has to be given to the anionic additives as they are advantageously added in the form of their readily soluble with inorganic or organic cations. It is, therefore, advisable to look, in many instances for the presence of the various cations in the combinations, paving the way for satisfactory further additions.

The combinations, in accordance with the invention, as has already been noted, are suitable for use alone or as has just been set out in combination with various additives, numerous instances of which have been set out.

The following examples illustrate the invention without limiting it thereto:

A number of compositions were prepared for evaluating their effectiveness as detergents, wetting agents, emulsifiers, namely powdery preparations containing a disalt and similar powdery preparations substantially free of disalts were prepared for evaluation under comparative conditions. In making the test powders, the component materials were dissolved and the resulting aqueous solutions converted in a spray dryer to a fine powder having a moisture content of about 2–7%. All of the powders so prepared could be passed in their entirety through a sieve having a clear mesh width of 4.25 mm. 230 cc. of each of the powders were then filled into detergent boxes, sealed and stored in an atmospheric test chamber, through which air was circulated, for 7 days at 32° C. and 80% relative humidity. The detergent boxes which were used were made of the usual strawboard and contained no lining or additive for preventing the exchange of moisture through the box walls. At the end of this period, the boxes were opened and their contents were examined for caking and tested for pourability.

A commercially available apparatus was used in the experimental procedure to avoid errors in the test procedure. The apparatus consisted of a container having a screen mounted at one end which was moved at a constant rate and had a fixed opening, so that the results could be duplicated. The time was measured starting from the point at which the powdered material was placed on the screen until all of the powder had passed through the screen, or to the end of the time set for the experiment. The experiment is generally stopped when no appreciable amount of powder passes through the screen. The residue remaining on the screen is then weighed.

The results as stated in the examples hereinafter, therefore, characterize on the one hand the tendency of the powder to cake and on the other hand its ability to flow freely. The tendency of the powder to cake can be appreciated from the amount of residue left on the screen while the time it takes for the powder to run through the sieve is a measure of its free-flowing ability.

The data obtained in the experiments are recorded in the following table: unless otherwise expressly stated, the salts are sodium salts and, in the case of the sulfonated fatty acids, they are disodium salts.

| Ex. No. | Composition of the Preparation | Weight percent left on screen | Sieve Run-through time |
|---|---|---|---|
| 1a | 50% sulfo ester salt prepared from hydrogenated palm kernel fatty acid ethyl ester, 50% sodium sulfate. | 95 | 3,600 sec. |
| 1b | 40% sulfo ester salt prepared from hydrogenated palm kernel fatty acid ethyl ester, 10% sulfo fatty acid salt prepared from hydrogenated palm kernel fatty acid, 50% sodium sulfate. | 33 | 900 sec. |
| 1c | 30% sulfo ester salt prepared from hydrogenated palm kernel fatty acid ethyl ester, 20% sulfo fatty acid salt prepared from hydrogenated palm kernel fatty acid, 50% sodium sulfate. | 0 | 120 sec. |
| 1d | 20% sulfo ester salt prepared from hydrogenated palm kernel fatty acid ethyl ester, 30% sulfo fatty acid salt prepared from hydrogenated palm kernel fatty acid, 50% sodium sulfate. | 0 | 40 sec. |
| 2a | 25% sulfo ester salt prepared from hydrogenated palm kernel fatty acid ethyl ester, 35% $Na_4P_2O_7$ [sodium pyrophosphate], 5% water glass, 3% coconut fatty acid ethanolamide, 32% sodium sulfate. | 13 | 2 min. |
| 2b | 22.5% sulfo ester salt prepared from hydrogenated palm kernel fatty acid ethyl ester, 2.5% sulfo fatty acid salt prepared from hydrogenated palm kernel fatty acid, 35% sodium pyrophosphate, 5% water glass, 3% coconut fatty acid ethanol amide, 32% sodium sulfate. | 0 | 2 min. |
| 3a | 25% sulfo ester salt of hydrogenated palm kernel fatty acid methyl ester, 30% sodium pyrophosphate, 5% water glass, 3% coconut fatty acid ethanolamide, 37% sodium sulfate. | 32 | 2 min. |
| 3b | 22.5% sulfo ester salt of hydrogenated palm kernel fatty acid methyl ester, 2.5% sulfo fatty acid salt of hydrogenated palm kernel fatty acid, 30% sodium pyrophosphate, 5% water glass, 3% coconut oil fatty acid ethanolamide, 37% sodium sulfate. | 0 | 2 min. |
| 3c | 17.5% sulfo ester salt of hydrogenated palm kernel fatty acid methyl ester, 7.5% sulfo fatty acid salt of hydrogenated palm kernel fatty acid, 30% sodium pyrophosphate, 5% water glass, 3% coconut fatty acid ethanolamide, 37% sodium sulfate. | 0 | 2 min. |
| 3d | 10% sulfo ester salt of hydrogenated palm kernel fatty acid methyl ester, 15% sulfo fatty acid made from hydrogenated palm kernel fatty acid, 30% sodium pyrophosphate, 5% water glass, 3% coconut fatty acid ethanolamide, 37% sodium sulfate. | 0 | 2 min. |
| 4a | 50% sulfo ester salt of hydrogenated coconut fatty acid methyl ester, 50% sodium sulfate. | 92 | 60 min. |
| 4b | 40% sulfo ester salt of hydrogenated coconut fatty acid methyl ester, 10% sulfo fatty acid salt of hydrogenated coconut fatty acid, 50% sodium sulfate. | 32 | 15 min. |
| 4c | 30% sulfo ester salt of hydrogenated coconut fatty acid methyl ester, 20% sulfo fatty acid salt of hydrogenated coconut fatty acid, 50% sodium sulfate. | 0 | 8 min. |
| 5a | 35% sulfo ester salt of hydrogenated palm kernel fatty acid ethyl ester, 30% sodium pyrophosphate, 5% water glass, 3% coconut fatty acid ethanolamide, 27% sodium sulfate. | 17 | 6 min. |
| 5b | 31.5% sulfo ester salt prepared from hydrogenated palm kernel fatty acid ethyl ester, 3.5% sulfo fatty acid salt prepared from hydrogenated palm kernel fatty acid, 30% sodium pyrophosphate, 5% water glass, 3% coconut fatty acid ethanolamide, 27% sodium sulfate. | 9 | 6 min. |
| 5c | 24.5% sulfo ester salt prepared from hydrogenated palm kernel fatty acid ethyl ester, 10.5% sulfo fatty acid salt of hydrogenated palm kernel fatty acid, 30% sodium pyrophosphate, 5% water glass, 3% coconut fatty acid ethanolamide, 27% sodium sulfate. | 0 | 3 min. |
| 6a | 50% sulfo ester salt prepared from hydrogenated coconut oil (one sulfonate group per fatty acid radical), 50% sodium sulfate. | 93 | 10 min. |
| 6b | 40% sulfo ester salt of hydrogenated coconut oil, 10% sulfo fatty acid salt of hydrogenated coconut fatty acid, 50% sodium sulfate. | 65 | 10 min. |
| 6c | 30% sulfo ester salt of hydrogenated coconut oil, 20% sulfo fatty acid salt of hydrogenated coconut fatty acid, 50% sodium sulfate. | 0 | 6 min. |
| 7a | 15% sulfo ester salt of hydrogenated coconut fatty acid methyl ester, 15% sulfo ester salt of hydrogenated tallow fatty acid isopropyl ester, 70% sodium sulfate. | 32 | 10 min. |
| 7b | 12.5% sulfo ester salt of hydrogenated coconut fatty acid methyl ester, 12.5% sulfo ester salt of hydrogenated tallow fatty acid isopropyl ester, 5.0% sulfo fatty acid salt of hydrogenated coconut fatty acid, 70% sodium sulfate. | 6.5 | 10 min. |
| 7c | 10% sulfo ester salt of hydrogenated coconut fatty acid methyl ester, 10% sulfo ester salt of hydrogenated tallow fatty acid isopropyl ester, 10% sulfo fatty acid salt of hydrogenated coconut fatty acid, 70% sodium sulfate. | 0 | 3 min. |
| 8a | 10% sulfo ester salt of hydrogenated coconut fatty acid methyl ester, 10% sulfo ester salt of hydrogenated tallow fatty acid isopropyl ester, 80% sodium sulfate. | 14.5 | 10 min. |
| 8b | 7.5% sulfo ester salt of hydrogenated coconut fatty acid methyl ester, 7.5% sulfo ester salt of hydrogenated tallow fatty acid isopropyl ester, 5.0% sulfo fatty acid salt of hydrogenated coconut fatty acid, 80% sodium sulfate. | 0 | 5 min. |
| 9a | 30% sulfo ester salt of the methyl ester of the $C_8$–$C_{10}$ first runnings from coconut fatty acid, 70% sodium sulfate. | 88 | 10 min. |
| 9b | 20% sulfo ester salt of the methyl ester of the $C_8$–$C_{10}$ first runnings from coconut fatty acid, 10% sulfo fatty acid salt of hydrogenated palm kernel fatty acid, 70% sodium sulfate. | 17.6 | 10 min. |
| 10a | 20% sulfo ester salt of the methyl ester of the $C_8$–$C_{10}$ first runnings from coconut fatty acid, 80% sodium sulfate. | 51 | 10 min. |
| 10b | 15% sulfo ester salt of the methyl ester of the $C_8$–$C_{10}$ first runnings from coconut fatty acid, 5% sulfo fatty acid salt of hydrogenated coconut fatty acid, 80% sodium sulfate. | 7.2 | 10 min. |
| 10c | 10% sulfo ester salt of the methyl ester of the $C_8$–$C_{10}$ first runnings from coconut fatty acid, 10% sulfo fatty acid salt of hydrogenated coconut fatty acid, 80% sodium sulfate. | 0 | 2 min. |
| 11a | 40% sulfo ester salt of hydrogenated coconut fatty acid methyl ester, 60% sodium sulfate. | 80 | 15 min. |
| 11b | 40% sulfo ester salt of hydrogenated coconut fatty acid methyl ester, 10% sulfo fatty acid salt of hydrogenated coconut fatty acid, 50% sodium sulfate. | 32 | 15 min. |
| 12a | 30% sulfo ester salt of hydrogenated coconut fatty acid methyl ester, 70% sodium sulfate. | 50 | 10 min. |
| 12b | 30% sulfo ester salt of hydrogenated coconut fatty acid methyl ester, 20% sulfo fatty acid salt of hydrogenated coconut fatty acid, 50% sodium sulfate. | 0 | 8 min. |
| 13a | 40% sulfo ester salt of hydrogenated coconut fatty acid ethyl ester, 60% sodium sulfate. | 90 | 15 min. |
| 13b | 40% sulfo ester salt of hydrogenated coconut fatty acid ethyl ester, 10% sulfo fatty acid salt of hydrogenated coconut fatty acid, 50% sodium sulfate. | 33 | 15 min. |
| 14a | 30% sulfo ester salt of hydrogenated palm kernel fatty acid ethyl ester, 70% sodium sulfate. | 90 | 10 min. |
| 14b | 30% sulfo ester salt of hydrogenated palm kernel fatty acid ethyl ester, 20% sulfo fatty acid salt of palm kernel fatty acid, 50% sodium sulfate. | 0 | 2 min. |
| 15a | 15% sulfo ester salt of ethylene-glycol-monoethylether palmitate,[1] 25% sulfo ester salt of hydrogenated palm kernel fatty acid methyl ester, 60% sodium sulfate. | 40 | 10 min. |
| 15b | 15% sulfo ester salt of ethylene-glycolmonoethylether palmitate,[1] 15% sulfo ester salt of hydrogenated palm kernel fatty acid methyl ester 10% sulfo fatty acid of palmitic acid, 60% sodium sulfate. | 3.7 | 5 min. |

See footnotes at end of table.

| Ex. No. | Composition of the Preparation | Weight percent left on screen | Sieve Run-through time |
|---|---|---|---|
| 16a | 10% sulfo ester salt of ethylene-glycolmonoethylether palmitate,[1] 10% sulfo ester salt of hydrogenated palm kernel fatty acid methyl ester, 80% sodium sulfate. | 12 | 10 min. |
| 16b | 5% sulfo ester salt of ethylene-glycolmonoethylether palmitate,[1] 10% sulfo ester salt of hydrogenated palm kernel fatty acid methyl ester, 5% sulfo fatty acid of palmitic acid, 80% sodium sulfate. | 0 | 5 min. |
| 16c | 10% sulfo ester salt of ethylene-glycolmonoethylether palmitate,[1] 10% sulfo ester salt of hydrogenated palm kernel fatty acid methyl ester, 10% sulfo fatty acid salt of palmitic acid, 70% sodium sulfate. | 0 | 1 min. |
| 17a | 25% tetrapropylene benzenesulfonate, 25% sulfo ester salt of hydrogenated palm kernel fatty acid methyl ester, 50% sodium sulfate. | 95 | 2 min. |
| 17b | 22.5% tetrapropylene benzenesulfonate, 22.5% sulfo ester salt of hydrogenated palm kernel fatty acid methyl ester, 5.0% sulfo fatty acid salt of hydrogenated palm kernel fatty acid, 50.0% sodium sulfate. | 50 | 2 min. |
| 17c | 20.0% tetrapropylene benzenesulfonate, 20.0% sulfo ester salt of hydrogenated palm kernel fatty acid methyl ester, 10.0% sulfo fatty acid salt of hydrogenated palm kernel fatty acid, 50.0% sodium sulfate. | 21 | 2 min. |
| 17d | 15% tetrapropylene benzenesulfonate, 15% sulfo ester salt of hydrogenated palm kernel fatty acid methyl ester, 20% sulfo fatty acid salt of hydrogenated palm kernel fatty acid, 50% sodium sulfate. | 0 | 2 min. |
| 18a | 15% sulfatized addition product of 2 mols ethylene oxide and one mol of a 12 to 18-carbon fatty alcohol, 15% sulfo ester salt of hydrogenated palm kernel fatty acid methyl ester, 70% sodium sulfate. | 28 | 10 min. |
| 18b | 10.0% sulfatized addition product of 2 mols ethylene oxide and 1 mol of a 12 to 18-carbon fatty alcohol, 10.0% sulfo ester salt of hydrogenated palm kernel fatty acid methyl ester, 10.0% sulfo fatty acid salt of hydrogenated palm kernel fatty acid 70.0% sodium sulfate. | 0 | 4 min. |
| 19a | 15% tetrapropylene benzenesulfonate, 15% sulfo ester salt of hydrogenated palm kernel fatty acid methyl ester, 30% sodium pyrophosphate, 3% coconut fatty acid monoethanolamide, 5% water glass, 32% sodium sulfate. | 12 | 10 min. |
| 19b | 12.5% tetrapropylene benzenesulfonate, 12.5% sulfo ester salt of hydrogenated palm kernel fatty acid methyl ester, 5.0% sulfo fatty acid salt of hydrogenated palm kernel fatty acid, 30.0% sodium pyrophosphate, 3.0% coconut fatty acid monoethanolamide, 5.0% water glass, 32.0% sodium sulfate. | 0 | 6 min. |
| 19c | 10.0% tetrapropylene benzenesulfonate, 10.0% sulfo ester salt of hydrogenated palm kernel fatty acid methyl ester, 10.0% sulfo fatty acid salt of hydrogenated palm kernel fatty acid methyl ester, 30.0% sodium sulfate, 3.0% coconut fatty acid monoethanolamide, 5.0% water glass, 32.0% sodium sulfate. | 0 | 3 min. |
| 20a | 24% sulfo ester salt of hydrogenated coconut fatty acid monomethyl ester, 6% sulfate of a 12 to 18-carbon fatty alcohol made from coconut fatty alcohol, 70% sodium sulfate. | 0 | 8 min. |
| 20b | 21.6% sulfo ester salt of hydrogenated coconut fatty acid monomethyl ester, 2.4% sulfo fatty acid salt of hydrogenated coconut fatty acid, 6.0% sulfate of a 12 to 18-carbon fatty alcohol made from coconut fatty alcohol, 70.0% sodium sulfate. | 0 | 1 min. |
| 21a | 15% sulfo ester salt of hydrogenated palm kernel fatty acid methyl ester, 15% Mersolat (saponification product of a sulfochlorinated 12 to 18-carbon paraffinic hydrocarbon), 32% sodium sulfate, 30% sodium pyrophosphate, 3% coconut fatty acid monoethanolamide, 5% water glass. | 20 | 10 min. |
| 21b | 12.5% sulfo ester salt of hydrogenated palm kernel fatty acid methyl ester, 12.5% Mersolat, 5.0% sulfo fatty acid salt of hydrogenated palm kernel fatty acid, 32.0% sodium sulfate, 30.0% sodium pyrophosphate, 3% coconut fatty acid monoethanolamide, 5% water glass. | 1 | 10 min. |
| 22a | 15% sulfo ester salt of hydrogenated palm kernel fatty acid methyl ester, 15% Mersolat, 70% sodium sulfate. | 65.4 | 10 min. |
| 22b | 12.5% sulfo ester salt of hydrogenated palm kernel fatty acid methyl ester, 12.5% Mersolat, 5% sulfo fatty acid salt of hydrogenated palm kernel fatty acid, 70% sodium sulfate. | 35.0 | 10 min. |
| 22c | 10% sulfo ester salt of hydrogenated palm kernel fatty acid methyl ester, 10% Mersolat, 10% sulfo fatty acid salt of hydrogenated palm kernel fatty acid, 70% sodium sulfate. | 2 | 4 min. |
| 23a | 15% sulfonated, hardened coconut oil (one sulfonate group per radical), 15% Mersolat, 70% sodium sulfate. | 9.4 | 10 min. |
| 23b | 12.5% sulfonated, hardened coconut oil (one sulfonate group per radical), 12.5% Mersolat, 5% sulfo fatty acid salt of hydrogenated palm kernel fatty acid, 70% sodium sulfate. | 0 | 8 min. |
| 23c | 10.0% sulfonated, hardened coconut oil (one sulfonate group per radical), 10.0% Mersolat, 10% sulfo fatty acid salt of hydrogenated palm kernel fatty acid, 70% sodium sulfate. | 0 | 2 min. |
| 24a | 10% sulfo ester salt of hydrogenated coconut fatty acid methyl ester, 10% sulfatized addition product of 2 mols alkylene oxide to 1 mol of a $C_{12}$ to $C_{18}$ fatty alcohol mixture, 80% sodium sulfate. | 7.0 | 10 min. |
| 24b | 8% sulfo ester salt of hydrogenated coconut fatty acid methyl ester, 8% sulfatized addition product of 2 mols alkylene oxide to 1 mol of a 12 to 18-carbon fatty alcohol mixture, 4% sulfo fatty acid salt of hydrogenated coconut fatty acid, 80% sodium sulfate. | 0 | 3 min. |
| 25a | 12.5% sulfo ester salt of hydrogenated coconut fatty acid methyl ester, 12.5% sulfatized addition product of 2 mols alkylene oxide to 1 mol of a 12 to 18-carbon fatty alcohol mixture, 75% sodium sulfate. | 22.2 | 10 min. |
| 25b | 10% sulfo ester salt of hydrogenated coconut fatty acid methyl ester, 10% sulfatized addition product of 2 mols alkylene oxide to 1 mol of a 12 to 18-carbon fatty alcohol mixture, 5% sulfo fatty acid salt of hydrogenated coconut fatty acid, 75% sodium sulfate. | 0 | 4 min. |
| 26a | 12.5% sulfo ester salt of hydrogenated tallow fatty acid isopropyl ester, 12.5% Mersolat, 75% sodium sulfate. | 17 | 2 min. |
| 26b | 10% sulfo ester salt of hydrogenated tallow fatty acid isopropyl ester, 10% Mersolat, 5% sulfo fatty acid salt of hydrogenated tallow fatty acid, 75% sodium sulfate. | 0 | 2 min. |
| 26c | 12.5% sulfo ester salt of hydrogenated tallow fatty acid isopropyl ester, 12.5% Mersolat, 15% sulfo fatty acid salt of hydrogenated tallow fatty acid, 60% sodium sulfate. | 0 | 2 min. |
| 27a | 20% sulfo ester salt of hydrogenated tallow fatty acid isopropyl ester, 20% Mersolat, 60% sodium sulfate. | 17 | 10 min. |
| 27b | 15% sulfo ester salt of hydrogenated tallow fatty acid isopropyl ester, 15% Mersolat, 10% sulfo fatty acid salt of hydrogenated tallow fatty acid, 60% sodium sulfate. | 0 | 8 min. |
| 28a | 20% sulfo ester salt of hydrogenated coconut fatty acid methyl ester, 20% dodecylbenzenesulfonate, 60% sodium sulfate. | 70 | 10 min. |
| 28b | 17.5% sulfo ester salt of hydrogenated coconut fatty acid methyl ester, 17.5% dodecyl benzenesulfonate, 5% sulfo fatty acid salt of hydrogenated coconut fatty acid, 60% sodium sulfate. | 4 | 10 min. |
| 29a | 20% sulfo ester salt of hydrogenated coconut fatty acid methyl ester, 20% tetrapropylene benzenesulfonate, 60% sodium sulfate. | 80 | 2 min. |
| 29b | 20% sulfo ester salt of hydrogenated coconut fatty acid methyl ester, 20% tetrapropylene benzenesulfonate, 10% sulfo fatty acid salt of hydrogenated coconut fatty acid, 50% sodium sulfate. | 21 | 2 min. |
| 30a | 20% sulfo ester salt of lauric acid methyl ester, 20% tetrapropylene benzenesulfonate, 60% sodium sulfate. | 17 | 10 min. |
| 30b | 17.5% sulfo ester salt of lauric acid methyl ester, 17.5% tetrapropylene benzenesulfonate, 5% sulfo fatty acid salt of hydrogenated tallow fatty acid, 60% sodium sulfate. | 0 | 2 min. |
| 31a | 25% sulfo ester salt of the fatty acid methyl ester of the 8 to 10-carbon first runnings of coconut fatty acid (about 50% $C_{10}$), 25% sulfate of a 16 to 18-carbon fatty alcohol prepared from tallow fatty acid, 50% sodium sulfate. | 0 | 5 min. |
| 31b | 22.5% sulfo ester salt of the fatty acid methyl ester of the 8 to 10-carbon first runnings of coconut fatty acid (about 50% $C_{10}$), 22.5% sulfate of a 16 to 18-carbon fatty alcohol prepared from tallow fatty acid, 5.0% sulfo fatty acid salt of hydrogenated coconut fatty acid, 50% sodium sulfate. | 0 | 2 min. |

See footnotes at end of table.

| Ex. No. | Composition of the Preparation | Weight percent left on screen | Sieve Run-through time |
|---|---|---|---|
| 31c | 20% sulfo ester salt of the fatty acid methyl ester of the 8 to 10-carbon first runnings of coconut fatty acid (about 50% $C_{10}$), 20% sulfate of a 16 to 18-carbon fatty alcohol prepared from tallow fatty acid, 10% sulfo fatty acid salt of hydrogenated coconut fatty acid, 50% sodium sulfate. | 0 | 1 min. |
| 32a | 10% sulfo ester salt of ethyleneglycolmonoethylether palmitate,[2] 20% sulfatized addition product of 2 mols ethylene oxide and 1 mol of a $C_{12}$-$C_{14}$ fatty alcohol, 70% sodium sulfate. | 0 | 7 min. |
| 32b | 5% sulfo ester salt of ethylene glycol monoethylether palmitate,[2] 5% sulfo fatty acid salt of hydrogenated palmitic fatty acid, 20% sulfatized addition product of 2 mols ethylene oxide and 1 mol of a $C_{12}$-$C_{14}$ fatty alcohol,[1] 70% sodium sulfate. | 0 | 4 min. |
| 33a | 15% sulfo ester salt of hydrogenated coconut fatty acid methyl ester, 20% sodium soap of 12-18-carbon coconut fatty acid, 5% addition product of 10 mols ethylene oxide to 1 mol of a fatty alcohol prepared from a tallow fatty acid (iodine number 52), 35% sodium pyrophosphate, 25% sodium sulfate. | 30 | 2 min. |
| 33b | 10% sulfo ester salt of hydrogenated coconut fatty acid methyl ester, 5% sulfo fatty acid salt of hydrogenated coconut fatty acid, 20% sodium soap of 12 to 18-carbon coconut fatty acid, 5% addition product of 10 mols ethylene oxide to 1 mol of a fatty alcohol made from tallow fatty acid (iodine number 52), 35% sodium pyrophosphate, 25% sodium sulfate. | 0 | 2 min. |
| 34a | 15% sulfo ester salt of hydrogenated coconut fatty acid methyl ester, 15% sodium soap of 12 to 18-carbon coconut fatty acid, 5% addition product of 10 mols ethylene oxide to 1 mol of a fatty alcohol prepared from tallow fatty acid (iodine number 52), 35% sodium pyrophosphate, 30% sodium sulfate. | 16 | 2 min. |
| 34b | 10% sulfo ester salt of hydrogenated coconut fatty acid methyl ester, 5% sulfo fatty acid salt of hydrogenated coconut fatty acid, 15% sodium soap of 12 to 18-carbon coconut fatty acid, 5% addition product of 10 mols ethylene oxide to 1 mol of a fatty alcohol prepared from tallow fatty acid (iodine number 52), 35% sodium pyrophosphate, 30% sodium sulfate. | 0 | 2 min. |
| 35a | 10% sulfo ester salt of hydrogenated coconut oil acid methyl ester, 10% sodium soap of $C_{12}$-$C_{18}$-coconut oil acid, 3% addition product of 10 mols ethylene oxide and 1 mol of a fatty alcohol (iodine number 50) derived from stearic acid, 35% sodium pyrophosphate, 42% sodium sulfate. | 9 | 2 min. |
| 35b | 5% sulfo ester salt of hydrogenated coconut oil acid methyl ester, 5% sulfo fatty acid salt of hydrogenated coconut oil acid, 10% sodium soap of $C_{12}$-$C_{18}$-coconut oil acid, 3% addition product of 10 mol ethylene oxide and 1 mol of a fatty alcohol (iodine number 50) derived from stearic acid, 35% sodium pyrophosphate, 42% sodium sulfate. | 0 | 2 min. |
| 36a | 30% sulfo ester salt of hardened coconut oil acid methyl ester, 3% fatty dimethyl amino oxide prepared from coconut oil acid via the corresponding nitrile and reduction of the amine thereby produced, 67% sodium sulfate. | 34 | 2 min. |
| 36b | 20% sulfo ester salt of hardened coconut oil acid methyl ester, 10% sulfo fatty acid salt of hardened coconut oil acid, 3% fatty dimethyl amino oxide prepared from coconut oil acid via the corresponding nitrile and reduction of the amine thereby produced, 67% sodium sulfate. | 15 | 2 min. |
| 37a | 10% sulfo ester salt of hydrogenated coconut oil acid methyl ester, 20% sulfo ester salt of hydrogenated stearic acid isopropyl ester, 5% addition product of 10 mol ethylene oxide and 1 mol of a fatty alcohol (iodine number 55) derived from stearic acid, 65% sodium sulfate. | 14 | 5 min. |
| 37b | 7.5% sulfo ester salt of hydrogenated coconut oil acid methyl ester, 17.5% sulfo ester salt of hydrogenated stearic acid isopropyl ester, 5% addition product of 10 mol ethylene oxide and 1 mol of a fatty alcohol (iodine number 55) derived from stearic acid, 5% sulfo fatty acid salt of hydrogenated stearic acid, 65% sodium sulfate. | 0 | 2.5 min. |
| 38a | 17% sulfo ester salt of hydrogenated coco fatty acid methyl ester, 9% sodium soap of a $C_{12}$-$C_{18}$ coco fatty acid, 9% tetrapropylene benzene sulfonate, 65% sodium sulfate. | 16 | 2 min. |
| 38b | 11% sulfo ester salt of hydrogenated coco fatty acid methyl ester, 6% sulfo fatty acid salt of hydrogenated coco fatty acid, 9% sodium soap of a $C_{12}$-$C_{18}$ coco fatty acid, 9% tetrapropylene benzene sulfonate, 65% sodium sulfate. | 0 | 40 sec. |

[1] Equally satisfactory preparations are obtained when in place of the designated esters of sulfofatty acids and ethylene glycol monoethyl ethers, there are used other esters of ether alcohols, as for example of monovalent ether alcohols having 1-18 and preferably 1-10 carbon atoms in their molecules. These ether alcohols can, on the one hand, be obtained from monovalent alcohols having 1-4 carbon atoms in their molecules, and on the other hand, from 2-4 valent polyalcohols having 2-4 carbon atoms in their molecules or from inner ethers of polyalcohols, as for example, from polyglycols or polyglycerins. Instances of suitable replacements are the monomethyl, monoethyl, monopropyl, monoisopropyl, or monobutyl ethers of ethylene glycols, propylene glycols, butylene glycols, or di-or-triethylene glycol in the fatty acid esters.

[2] Similarly comparable compositions can be obtained when the esters of sulfo fatty acids with ethylene glycol monoethyl ethers set out in above examples are replaced by other esters of ether alcohols, as for example, of monovalent ether alcohols having 1-18 and preferably 1-10 carbon atoms in their molecules. These ether alcohols can, on the one hand, be monovalent alcohols having 1-4 carbon atoms in their molecule, and, on the other hand, 2-4 valent polyalcohols having 2-4 carbon atoms in their molecule, or they can be ethers of polyalcohols as exemplified by polyglycols, or polyglycerins. Examples are the monomethyl, monoethyl, monopropyl, monoisopropyl, monobutyl ethers of ethylene glycols, propylene glycols, butylene glycols, di-or-triethylene glycols as the alcohol component in the aforesaid sulfo fatty acid esters.

What is claimed is:

1. A surface active composition characterized by outstanding pouring and free-flowing properties comprising (a) about 5-65 weight percent of a salt of an α sulfo fatty acid having 10-24 carbon atoms in its molecule; and (b) about 35-95 weight percent of a surface active α sulfo fatty acid ester salt, the fatty acid radical component of which has 10-24 carbon atoms, the alcohol radical component being derived from a member selected from the group consisting of monovalent alcohols having 1-18 carbon atoms and polyvalent alcohols having 2-4 carbon atoms in their molecules, the cations of said salt being selected from one member of the group consisting of Na, K, Mg, and $NH_4$ cations.

2. A surface active composition according to claim 1 wherein said sulfo fatty acid salt is present in an amount of from 10-40 percent based on the total weight of the composition.

3. A surface active composition according to claim 1 wherein said sulfo fatty acid salt is a disalt.

4. A surface active composition according to claim 1 containing additional organic surface active materials selected from the group consisting of non-ionic surfactants, anionic surfactants and mixtures thereof, said additional surfactants being present in an amount up to 65 weight percent based on said ester salts and said additional surfactants.

5. A surface active composition according to claim 1 wherein said surface active sulfo fatty acid salt and said salt of a sulfo fatty acid ester are each present in said composition in discrete particle form.

6. A surface active composition according to claim 1 wherein said sulfo fatty acid ester salt and salt of a sulfo fatty acid are present together in the same particle.

7. A surface active composition according to claim 4 wherein said sulfo fatty acid salt is present in an amount of at least 10 percent of the total weight of the composition.

8. A surface active composition according to claim 4 wherein said sulfo fatty acid ester salt together with said sulfo fatty acid salt amount to from 10–75 percent of the total weight of the composition.

9. A surface-active composition, according to claim 4, containing pasty and oily non-ionic surfactants present in an amount not greater than 25 percent based on the total surfactant, ester salt and disalt.

10. A surface active composition according to claim 5 wherein the average particle size of said particles comprising the sulfo fatty acid salt is at most ⅕ that of the average particle size of the particles comprising the sulfo fatty acid ester salt.

References Cited by the Examiner

UNITED STATES PATENTS

| | | | |
|---|---|---|---|
| 2,195,145 | 3/1940 | Crittenden | 252—161 XR |
| 2,460,968 | 2/1949 | Bert et al. | 260—400 |
| 2,972,583 | 2/1961 | Hewitt | 252—161 |

OTHER REFERENCES

Stirton et al., "The Journal of the American Oil Chemists Society," January 1954, vol. 31, No. 1, pp. 13–16.

LEON D. ROSDOL, *Primary Examiner.*

JULIUS GREENWALD, *Examiner.*

A. T. MEYERS, *Assistant Examiner.*